Figure 15:
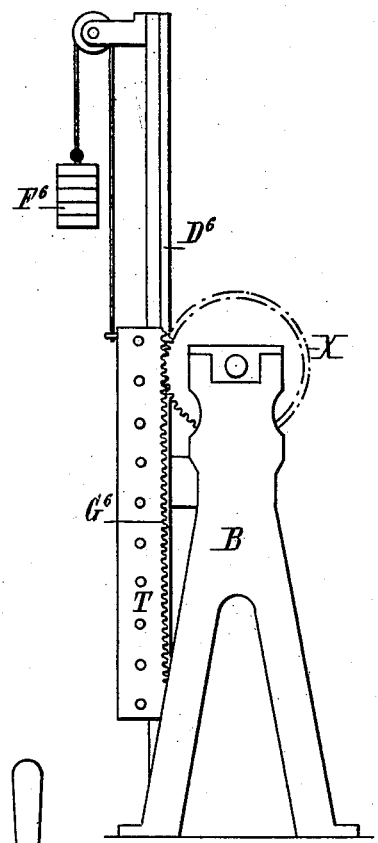

No. 743,052. PATENTED NOV. 3, 1903.
P. V. AVRIL, E. E. MARINIER & E. L. NAVOIT.
ENGRAVING MACHINE.
APPLICATION FILED OCT. 24, 1898.
NO MODEL. 11 SHEETS—SHEET 1.
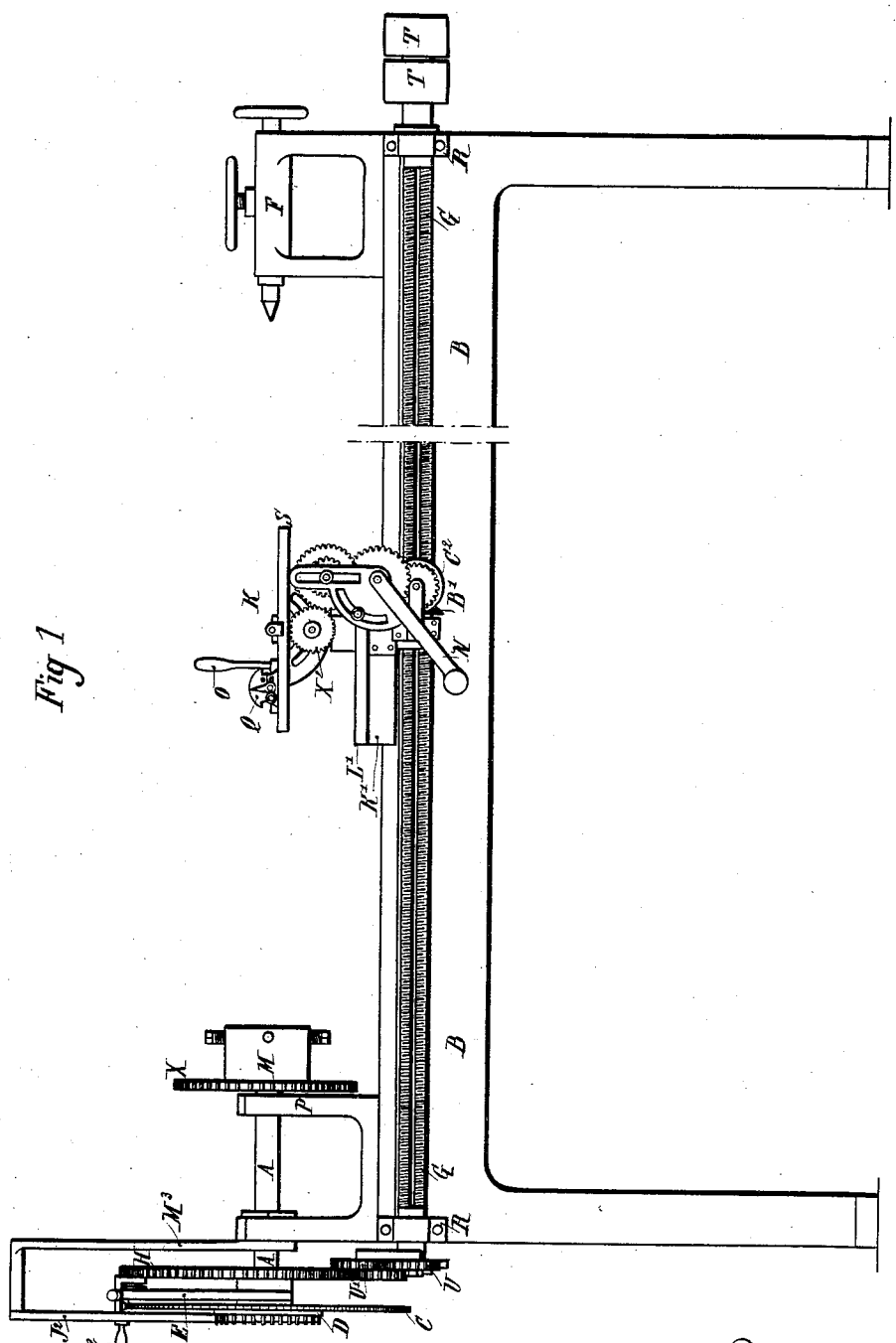

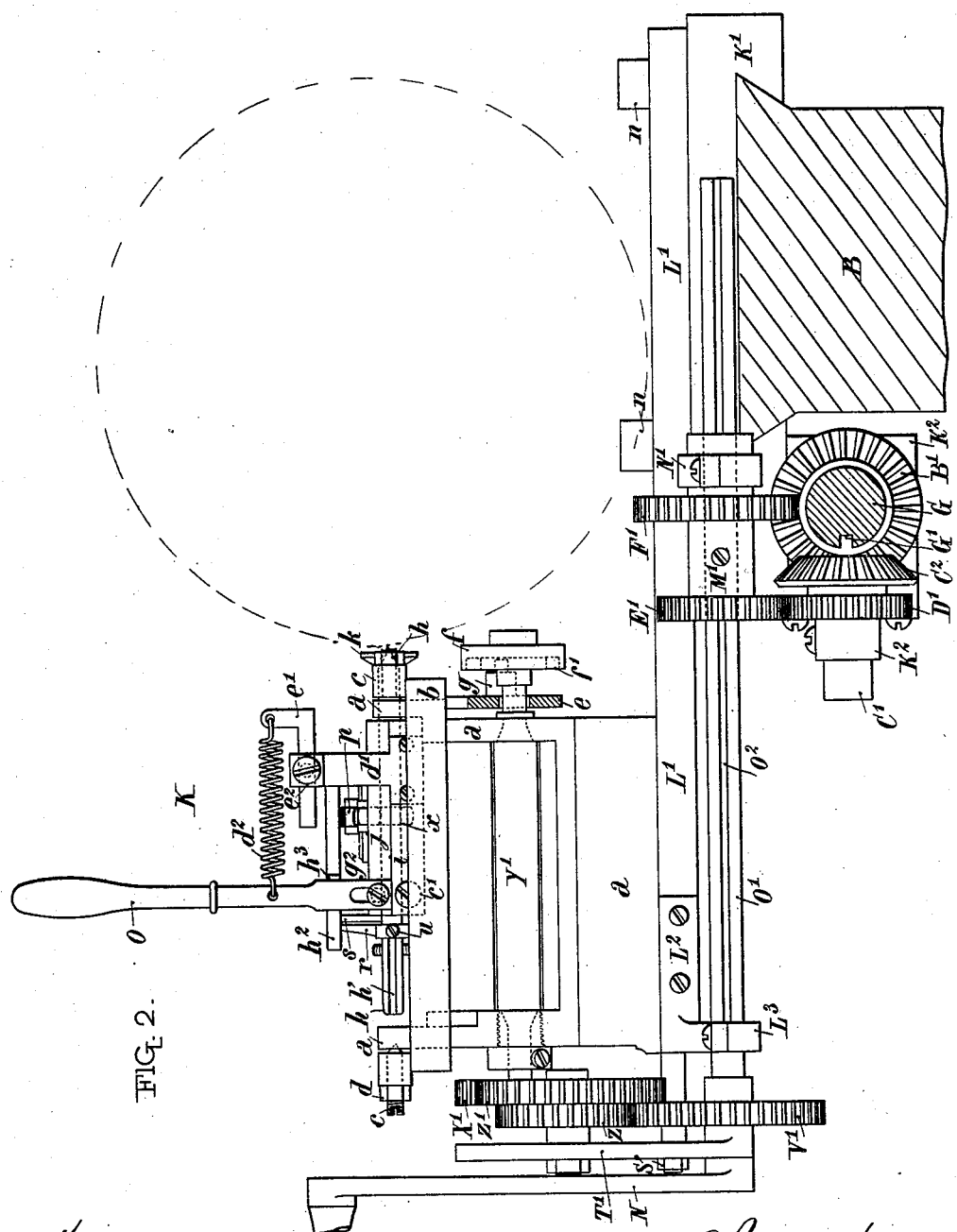

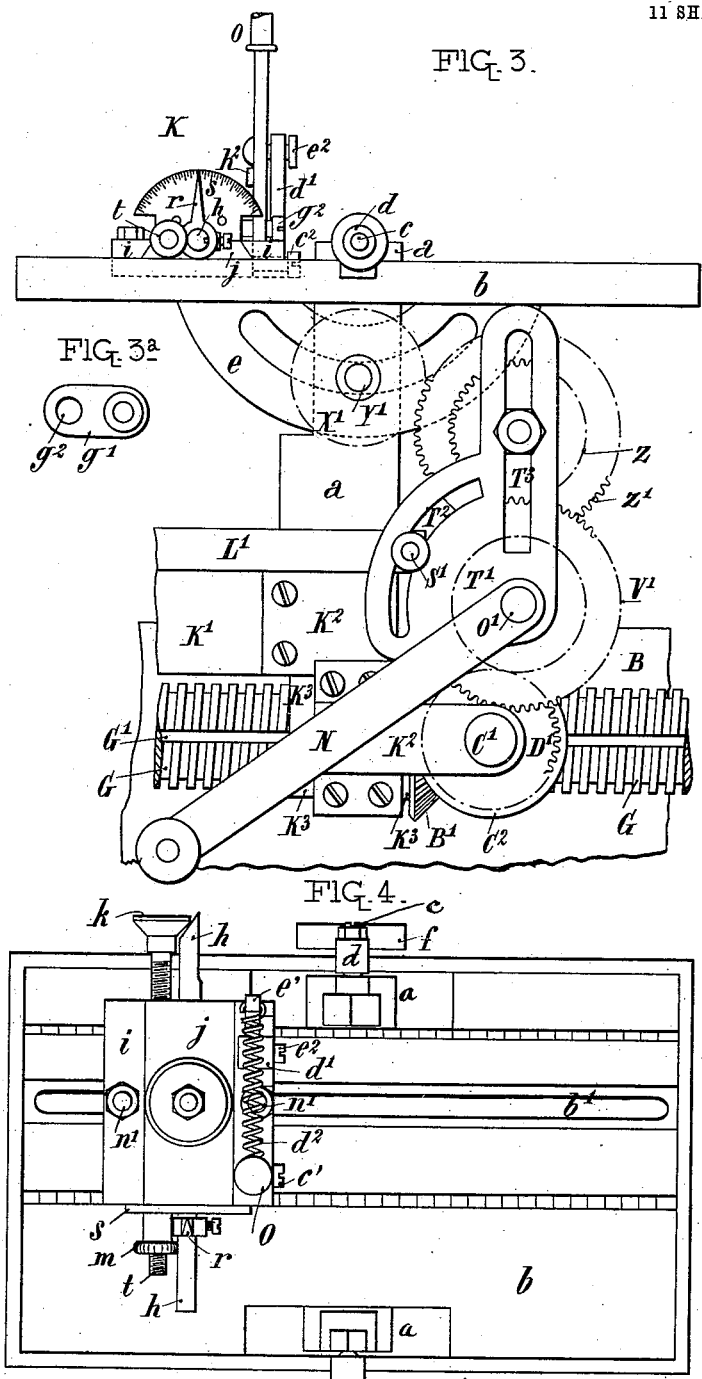

No. 743,052. PATENTED NOV. 3, 1903.
P. V. AVRIL, E. E. MARINIER & E. L. NAVOIT.
ENGRAVING MACHINE.
APPLICATION FILED OCT. 24, 1898.
NO MODEL. 11 SHEETS—SHEET 4.
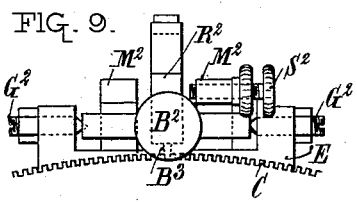
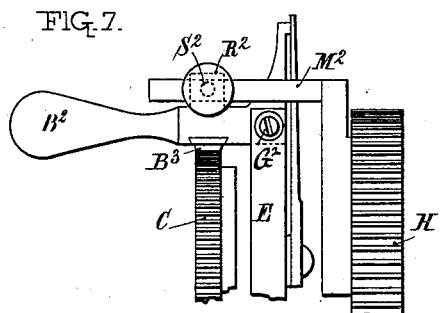
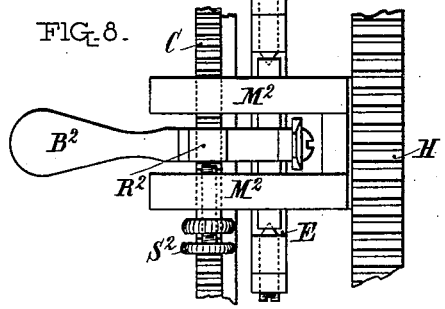
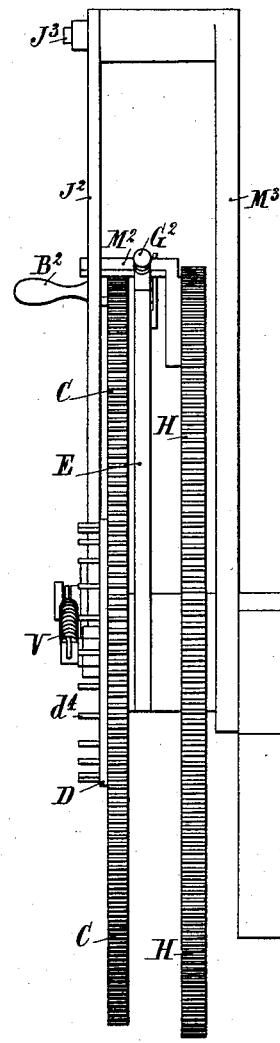
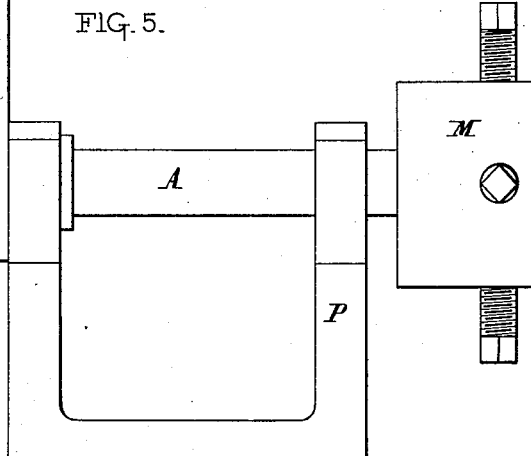

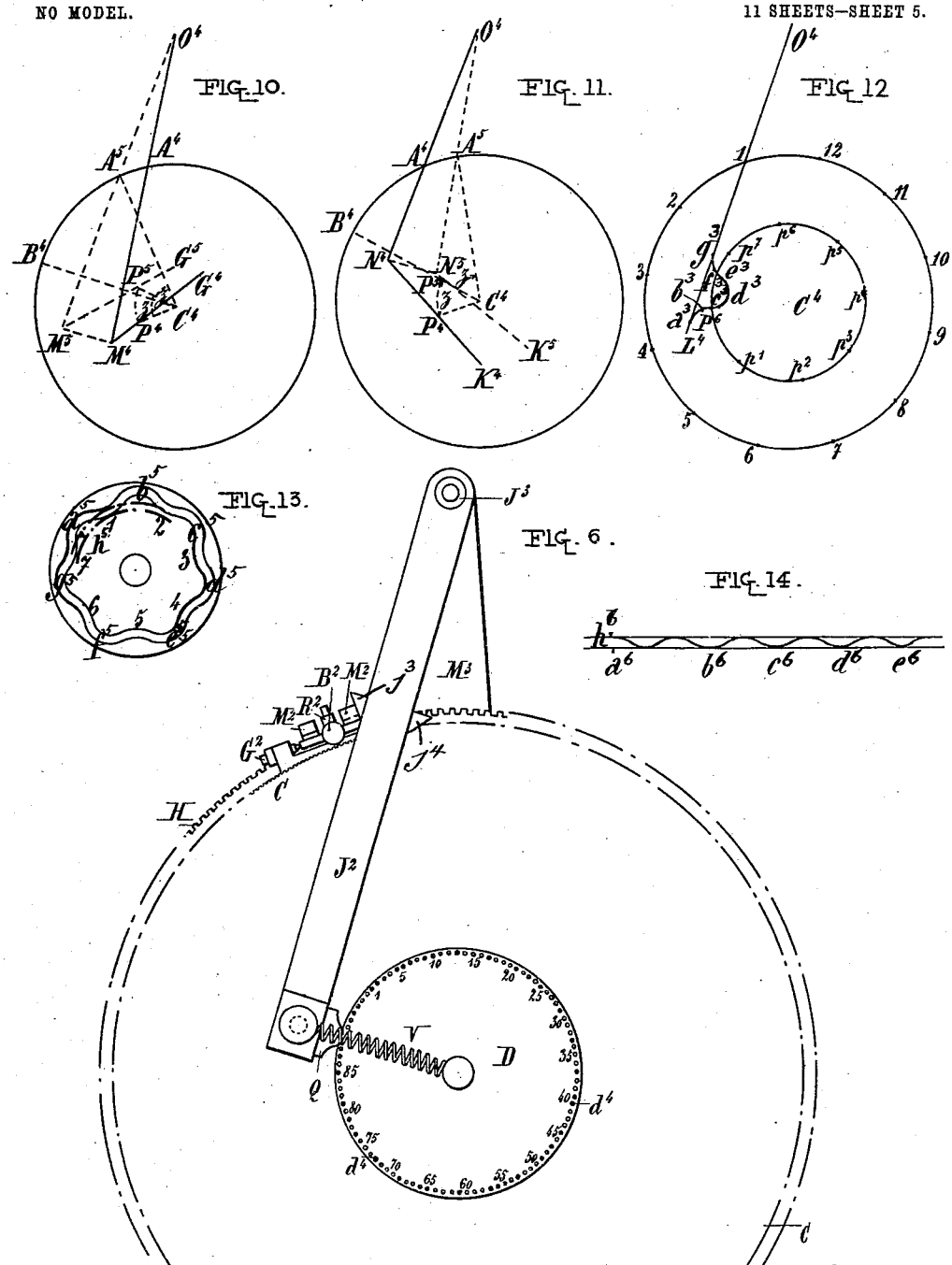

No. 743,052. PATENTED NOV. 3, 1903.
P. V. AVRIL, E. E. MARINIER & E. L. NAVOIT.
ENGRAVING MACHINE.
APPLICATION FILED OCT. 24, 1898.

NO MODEL. 11 SHEETS—SHEET 6.

No. 743,052. PATENTED NOV. 3, 1903.
P. V. AVRIL, E. E. MARINIER & E. L. NAVOIT.
ENGRAVING MACHINE.
APPLICATION FILED OCT. 24, 1898.

NO MODEL. 11 SHEETS—SHEET 7.

No. 743,052. PATENTED NOV. 3, 1903.
P. V. AVRIL, E. E. MARINIER & E. L. NAVOIT.
ENGRAVING MACHINE.
APPLICATION FILED OCT. 24, 1898.
NO MODEL. 11 SHEETS—SHEET 9.
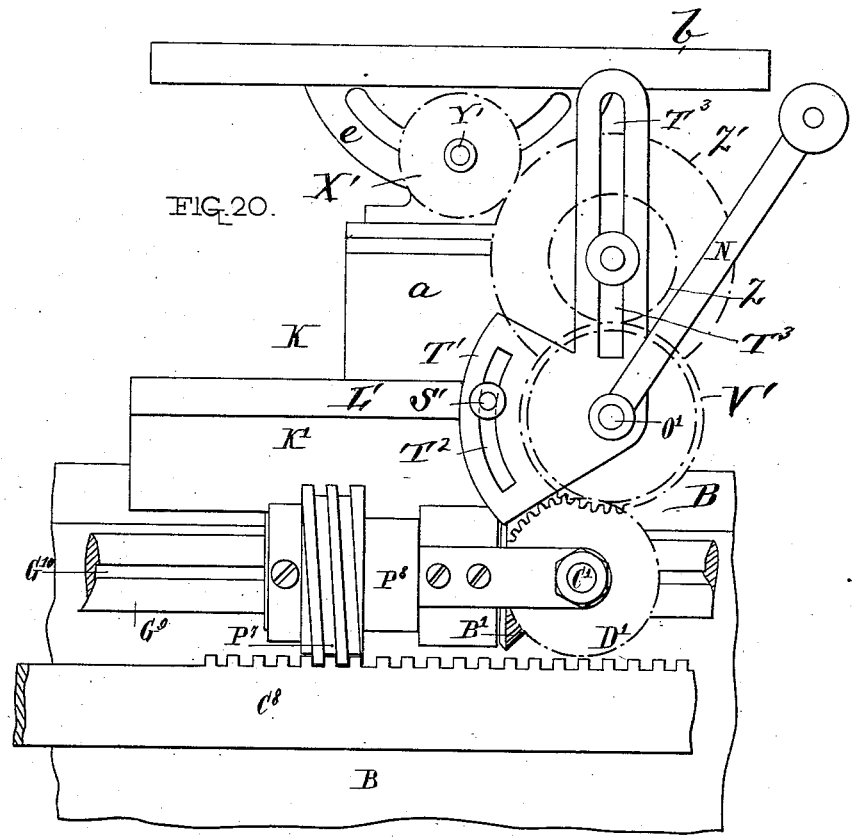
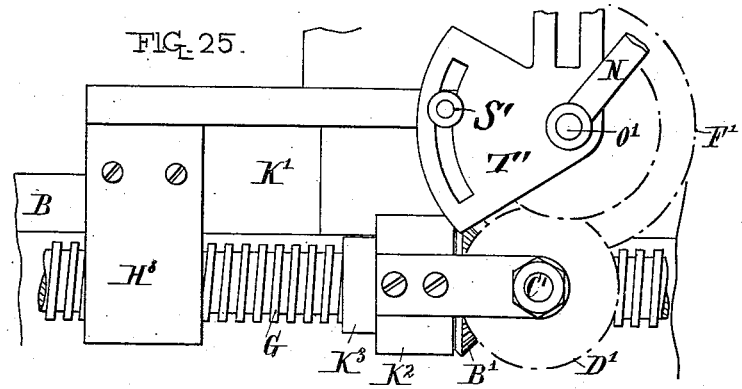
Witnesses:
A. E. Boulter.
O. Montrup
Inventors
Paul V. Avril
Ernest E. Marinier
Eugène L. Navoit
By Wm E. Boulter, attorney
THE NORRIS PETERS CO., PHOTO-LITHO., WASHINGTON, D. C.

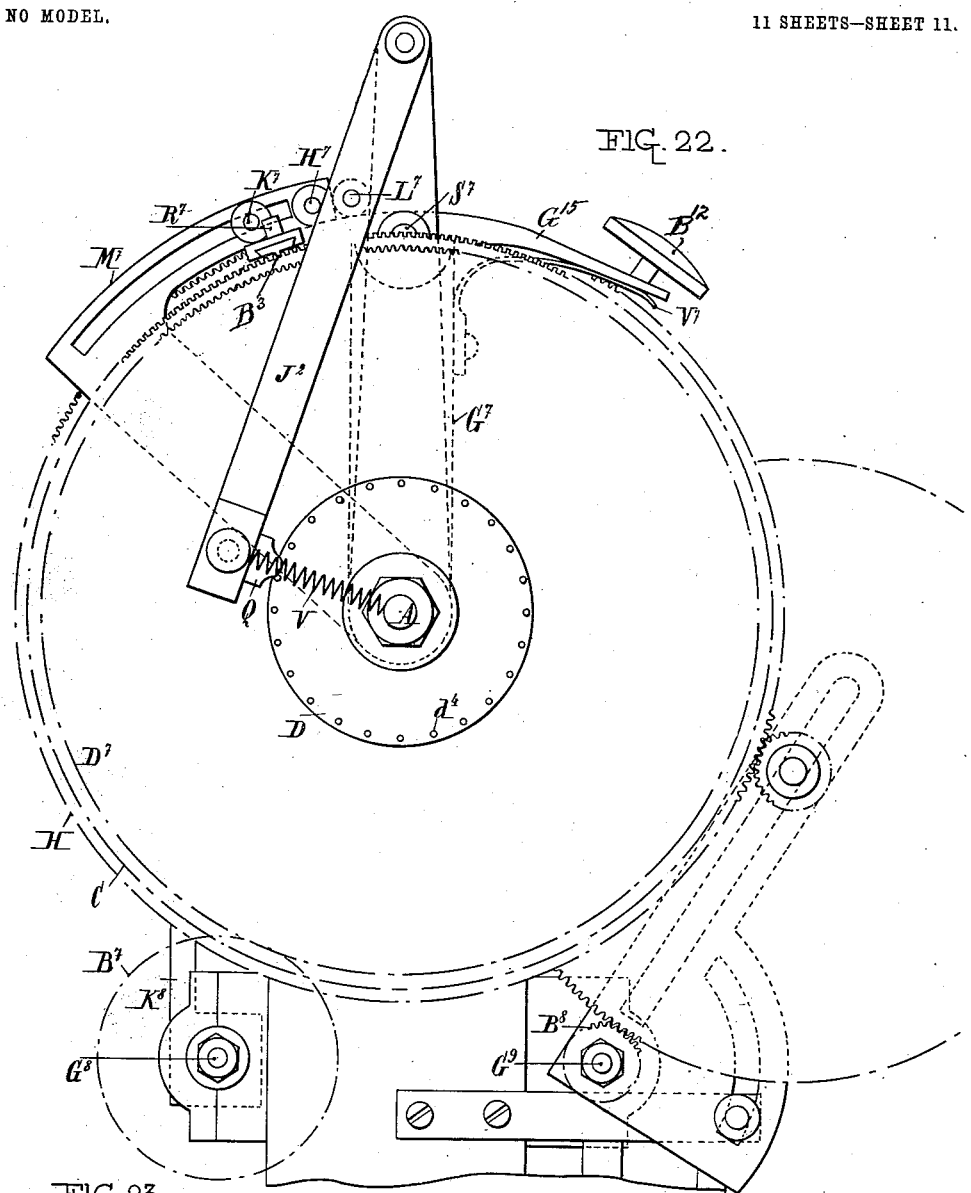
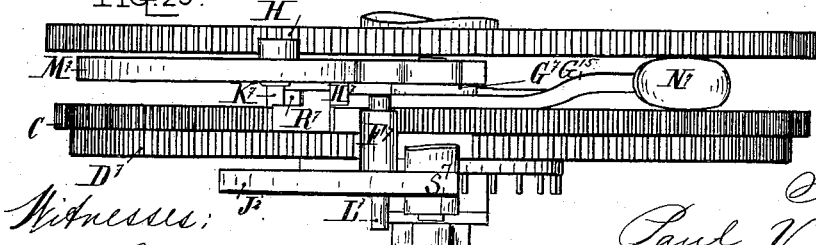

No. 743,052. Patented November 3, 1903.

UNITED STATES PATENT OFFICE.

PAUL VICTOR AVRIL, ERNEST EDOUARD MARINIER, AND EUGÈNE LOUIS NAVOIT, OF PARIS, FRANCE.

ENGRAVING-MACHINE.

SPECIFICATION forming part of Letters Patent No. 743,052, dated November 3, 1903.

Application filed October 24, 1898. Serial No. 694,475. (No model.)

*To all whom it may concern:*

Be it known that we, PAUL VICTOR AVRIL, ERNEST EDOUARD MARINIER, and EUGÈNE LOUIS NAVOIT, citizens of the Republic of France, residing at Paris, France, have invented certain new and useful Improvements in Engraving-Machines, of which the following is a full, clear, and exact description.

This invention relates to a new system of engraving for the purpose of obtaining a watering, embossing, printing, stamping, or ornamental surface on cylinders or plates, whereby new effects are obtained in moire, embossed, and stamped materials, and comprises the mechanical process and apparatus for producing said engraving for carrying the invention into effect. Water, embossing, and stamping effects hitherto produced have been obtained by means of cylinders or plates, preferably previously fluted on a machine, and on each of the flutes or grooves of which the engraver has cut faces, so as to present to the light variable planes of incidence, and consequently to give a shimmering effect, the whole of these faces in their grouping producing the various moire effects.

In order to obtain the new effects of watering, embossing, and stamping or printing, a smooth cylinder or plate is taken, and by means of a special device forming a part of this invention and hereinafter fully described two series of straight, curved, or wavy grooves are engraved with either constant intervals or intervals varying in a uniform manner, said two series of lines intersecting at suitable angles. These special conditions will be referred to hereinafter. At present only the essential characteristic feature of the invention will be pointed out, which is that the moire effect is obtained mechanically by the intersection of two series of grooves or lines, which by approaching and merging together for a certain distance and then having between them an interval present to the light more or less wide faces inclined at a more or less great angle (according to the curvature of the lines) and produce a decorative light effect applicable to all substances capable of being embossed, stamped, or provided with moire effects. The effect obtained depends on the four following conditions: first, on the angle of intersection of the grooves relatively one to the other; second, on the straight, wavy, or other form of the grooves; third, on the rule according to which the intervals vary; fourth, on the form of the burin or graver and the depth of the grooves. These four conditions can be varied *ad infinitum*, a new effect being produced with each variation. It will be understood that it is not necessary to previously make a design or pattern, as in ordinary moires, as the pattern is produced automatically. It will be also understood that three or more series of grooves may be used.

The essential characteristic features of the invention having thus been clearly explained, the mechanical device for carrying it into effect will now be described. The whole of these devices form a machine such as illustrated in the accompanying drawings in full details and modifications.

Figure 18:
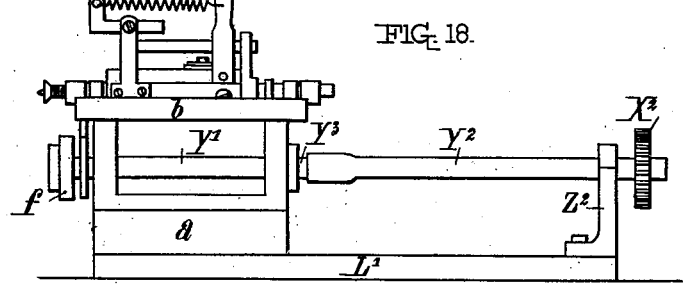
Figure 16:
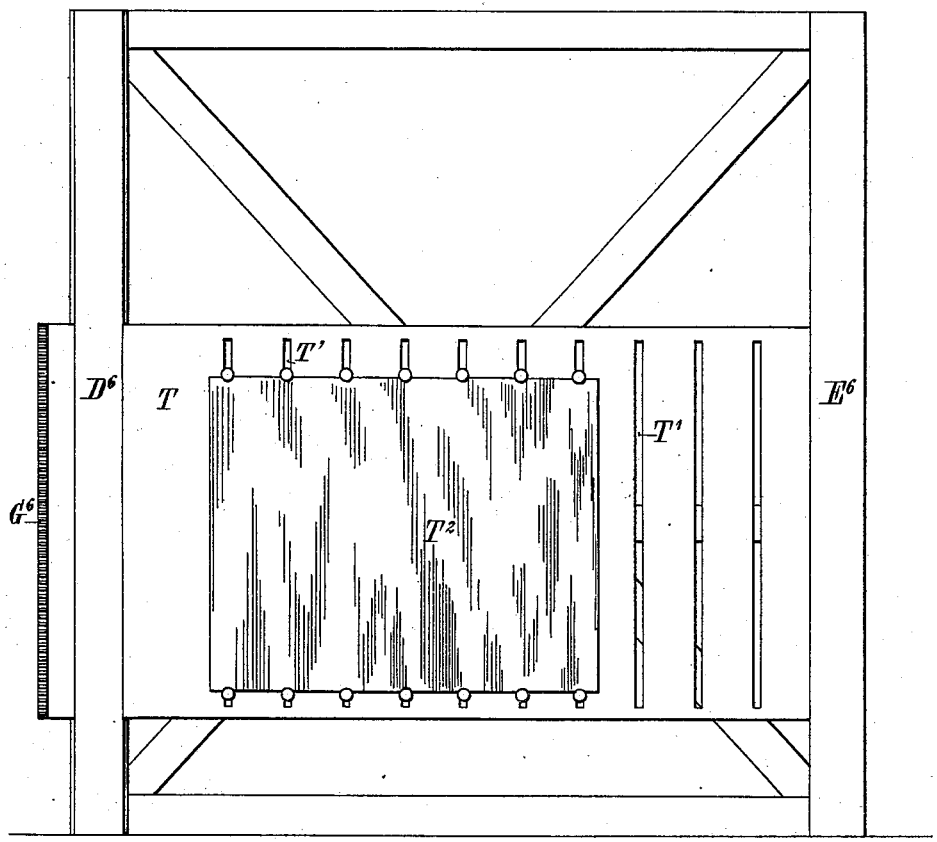
Figure 17:
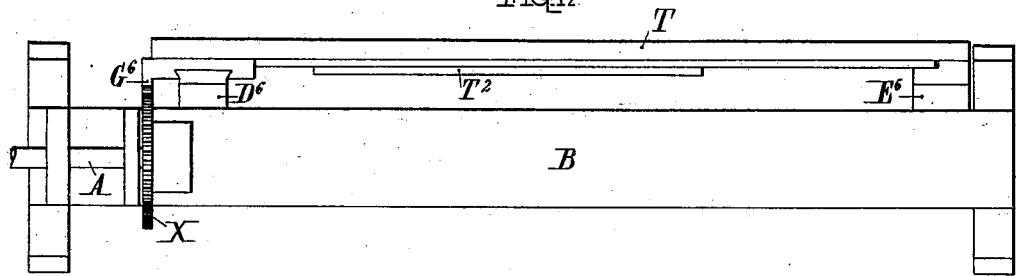
Figure 19:
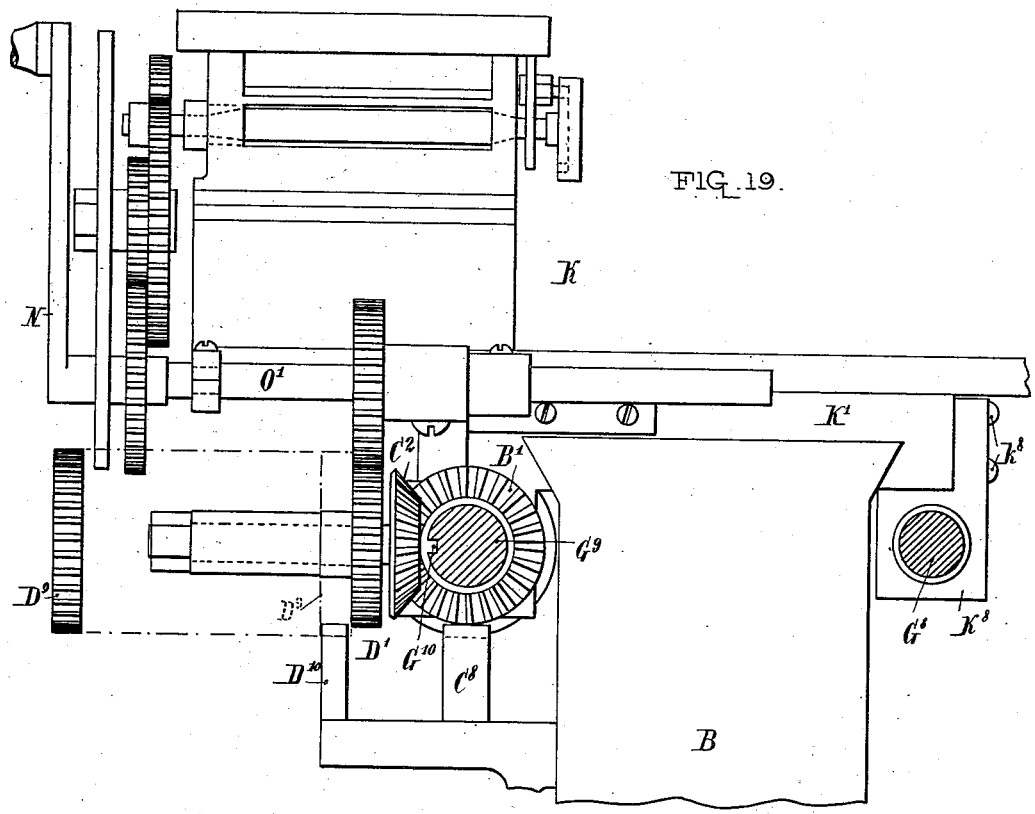
Figure 24:
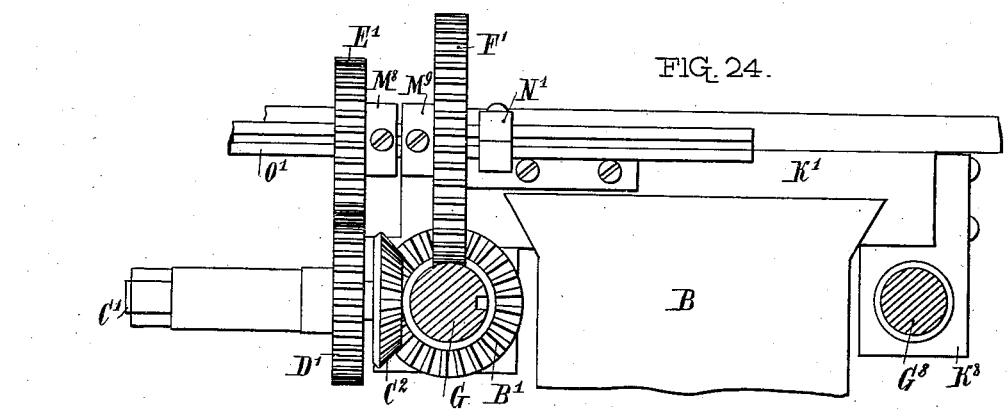
Figure 21:
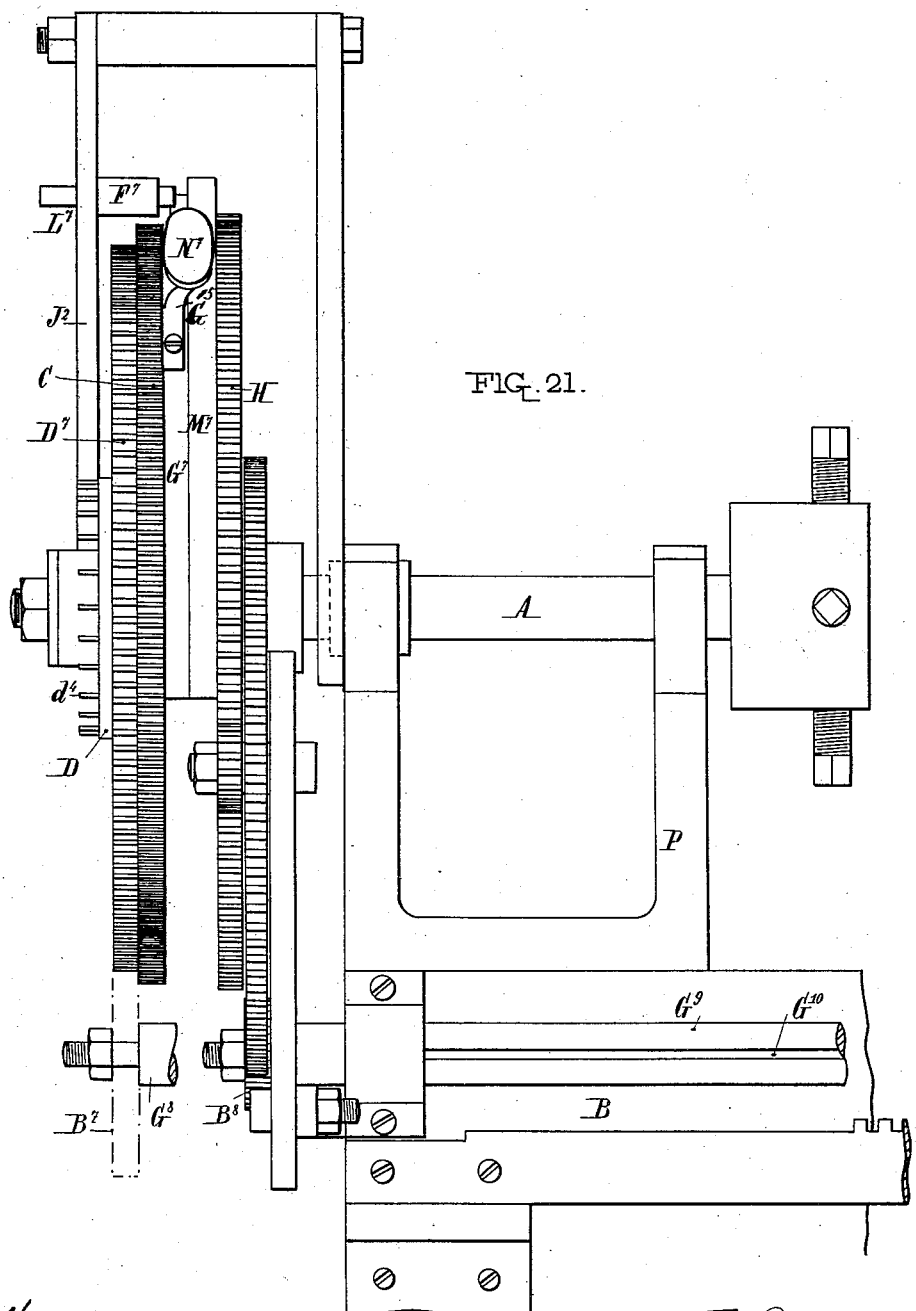

Figure 1 is a longitudinal elevation of the machine. Fig. 2 is a partial cross-section on a larger scale, showing the burin-holder slide and its working parts. Fig. 3 is a side view of the parts represented in Fig. 2. Fig. 3ª represents a detail of the burin-holder. Fig. 4 is a plan view of Fig. 3. Fig. 5 is a front elevation of parts of the dividing apparatus. Fig. 6 is a side elevation of same. Figs. 7, 8, and 9 represent an elevation, plan, and side view on the larger scale of the details of the dividing apparatus. Figs. 10, 11, and 12 are schematic views corresponding to the explanation of the theory on which the said dividing apparatus is based. Fig. 13 is a detail of the cam producing the movements of the burin-holder. Fig. 14 is a schematic view completing the view represented in Fig. 13. Figs. 15, 16, and 17 represent, respectively, a side view, front elevation, and plan of accessory parts of the machine for engraving plane surfaces. Fig. 18 represents a modification of the burin-holder for engraving plane surfaces. Figs. 19 and 20 are respectively a transverse section and a front elevation of modifications as regards the arrangement of the burin-holder. Figs. 21, 22, and 23 are respectively a front elevation, a side view, and plan of modifications in the arrangements of the dividing apparatus. Figs. 24 and 25 represent, respectively, a partial cross-section and a front elevation of another modification of the arrangement according to which the various parts actuating the machine may be combined.

The chief parts comprise a machined cast-iron bench B, a back-center F, a screw G, a burin-support or slide-rest K, (shown separately on a larger scale in Figs. 2, 3, and 4,) and a head-stock P, carrying dividing apparatus. (Shown separately on a larger scale in Figs. 5 to 9.)

The bench B and the back-center F are of the ordinary construction, as is usual in lathes.

The screw-spindle G, Figs. 2 and 3, is provided throughout the whole of its length with a deep groove G'. Said spindle rotates in two bearings R R, Fig. 1, and carries at one end a toothed wheel U and at its other end pulleys T T for the transmission-belt, if the machine is to be driven by a motor.

The slide-rest K consists of two main parts, one comprising the parts for advancing the burin and rotating the cylinder to be engraved and the other destined to produce oscillations of the burin and to render said oscillations dependent on the advance movement of the burin and rotation of the cylinder to be engraved.

The first part of the slide-rest K, comprising the parts for advancing the burin and rotating the cylinder to be engraved, which parts determine the direction of the lines or grooves on the cylinder, which are helical lines of a more or less great pitch or are coincident with the generatrices of the cylinders or are in the form of circles, is constituted as follows: a slide K', Figs. 2 and 3, sliding on the cast-iron bench B, and a bracket K², secured to said slide and provided with two circular openings, through one of which passes a socket K³, Fig. 3, not screw-threaded and provided with a bevel-pinion B', said socket being itself perforated to allow the passage of the screw-spindle G. The socket K³ is provided on its inner circumferential surface with a projection engaging with the groove G' of the screw G. The other opening of the bracket K² is arranged at right angles to the spindle G and receives a spindle C', Figs. 2 and 3, to which is keyed a bevel-pinion C², engaging with the corresponding pinion B'. The same spindle C' also carries a toothed wheel D', Figs. 2 and 3. To the side of the slide K' is secured a bearing N', through which passes a hollow sleeve M', Fig. 2, also provided with an inner projection. Two toothed wheels E' F' are keyed to said socket M', the wheel F' engaging with the screw-spindle G, which thus fulfils the function of a toothed rack, and the wheel E' engaging with the wheel D'.

The working of the parts described is as follows: When the spindle G turns, it causes, by means of its groove G', the socket K³ and the bevel-pinion B' to participate in its rotation. The bevel-pinion C², as well as the wheel D', will also be caused to rotate, and the latter will transmit its motion to the wheel E', and consequently to the wheel F'. As the latter engages with the spindle G it will move with it the slide K', and therefore the whole device. At the same time the toothed wheel U, Fig. 1, keyed to the screw-spindle G, will transmit, by means of intermediate wheels suitably proportioned, its rotation to the sleeve M, mounted on the dividing apparatus, Figs. 1, 5, 6, 7, 8, 9, and consequently also to the cylinder to be engraved. By suitably selecting the intermediate transmission-wheels relatively to the diameters of wheels U and H the sleeve M, and consequently the cylinder to be engraved, will be rotated at the desired speed. When the intermediate toothed wheels are done away with, the cylinder to be engraved does not rotate, as is necessary when it is desired to engrave on said cylinder grooves parallel to its axis. To change the direction of the helical lines, it is sufficient to add to the intermediate wheels another wheel which reverses the direction of rotation. Thus either right or left handed helical lines may be obtained, as desired. This arrangement is indispensable in order to obtain intersecting grooves.

The form of grooves is determined and produced by the oscillating movement of the burin, the mechanism of which constitutes, as already mentioned, the second part of the sliding support, and comprises a long plate L', Fig. 3, provided with a longitudinal slot or groove, through which pass two screws $n\,n$, serving to secure the plate L' firmly to the slide K', Fig. 2, at the place determined by the diameter of the cylinder to be engraved. The plate L' carries, by means of a bracket L², a bearing L³, through which passes a spindle O', provided with a journal supported in said bearing and with a longitudinal groove O², with which engages the projection of the socket M', through which said spindle O' passes, Fig. 2. To this spindle O' are keyed a crank N and a wheel V', Figs. 2 and 3. A sector T', provided with two grooves T² T³, is free to rotate on said spindle O'. The circular groove T² serves to secure the sector in position by means of a screw S'. The other groove T³, which is straight, is destined to receive in any desired position the spindle of the intermediate wheels Z Z'. The spindle O' therefore connects the wheel V' with the previously-described first part of the slide-rest. A bracket $a$, Figs. 2, 3, and 4, is bolted onto the plate L. This support is traversed by a spindle Y', to one end of which is keyed a wheel X', driven from the wheel V' by means of the intermediate wheels Z Z', carried by the sector T'. To the other end of the spindle Y' is secured a cam $f$, Figs. 2 and 13, which can be replaced by others as desired, and which is provided on its inner face with a groove $f'$ of a suitable shape, sinuous or otherwise, according to the kind of grooves to be produced on the cylinder to be engraved. A rectangular plate $b$ can oscillate between screw-points $c\ c$, which can be adjusted by a nut $d$, so as to compensate for wear. A sector $e$, secured under the plate $b$, is provided with a circular groove, which gives a free passage to the spindle $Y'$. A pin $g$ can by means of two nuts be fixed in suitable position in the circular groove of the sector $e$, said position depending on the diameter of the cam $f$, with the groove $f'$ of which the end of the pin $g$ engages. When the cam $f$ turns, it will, owing to the shape of its groove $f'$, impart a certain oscillating motion to the pin $g$, consequently also to the sector $e$ and to the plate $b$, supporting the burin. This movement, determined by the shape of the groove $f'$ of the cam $f$ employed, will determine, as will be easily understood, the shape of the sinuosities of the grooves cut by the burin $h$. By varying the revolutions of the intermediate wheels $Z\ Z'$, carried by sector $T'$, the frequency of oscillation of plate $b$, and consequently the transfer of the carriage and the length of the sinuosities, may be varied.

It will be easily understood that all the movements—the rotation of the screw-spindle G, rotation of the cylinder to be engraved, the advance of the burin, and the oscillation of the burin—take place together.

It may be necessary to trace rectilinear grooves. In this case the plate $b$, supporting the burin, must be rendered immovable. This is done as follows: The intermediate wheels $Z\ Z'$, supported by the sector $T'$, Fig. 3, are suppressed. Instead of the pin $g$ a part $g'$, Fig. $3^a$, provided with a hole $g^2$ of the same diameter as the spindle $Y'$, is secured to the groove of the sector $e$, said spindle $Y'$ engaging with the hole $g^2$, and thus prevents the plate $b$ from oscillating.

The burin-holder, which is secured to the plate $b$, Figs. 2, 3, and 4, is constituted as follows: A plate $i$ is placed on the plate $b$ of the carriage and is secured to this plate by bolts passing through a slot $b'$ of said plate. The plate $i$ is provided with a dovetail-shaped groove and has engaging with the latter a block $j$, provided with a hole for passage of the burin $h$, which preferably consists of a round steel rod of suitable diameter and having a longitudinal groove $h'$. A nut $p$ enables the burin to be securely fastened by means of a corresponding screw and a collar $x$. A pointer $r$ is secured to the burin $h$ by means of a screw $u$, the end of which engages with the groove $h'$ of the burin. The finding of the position of the cutting edge of the burin is always well insured by means of a divided sector $s$, combined with the pointer $r$, which is also utilized for placing the burin in a proper position for sharpening.

The depth of engraving is determined by the penetration of the burin, which is regulated and limited by a screw $t$, passing through the block $j$ and terminating in a small plate $k$, a lock-nut $m$ preventing the latter from changing its position. Two holes $n'$ in the plate $i$ form passages for bolts, serving to secure the apparatus to the plate $b$.

To regulate the depth of the engraving, the plate $k$ is adjusted toward or from the point of the burin $h$, which has been fixed in place.

The plate $b$ is provided with a longitudinal slot $b'$, enabling the burin-holder to be placed at any distance from the axis of oscillation. All along this slot there are marked divisions for facilitating the measuring of said distance, (an important precaution when the reproducing of a type of line already obtained is desired.) It is thus possible to vary the amplitude of the movement of the burin, and consequently to modify the shape of the groove.

Figs. 2 and 3 show how the burin is applied or disengaged, as desired, against the cylinder to be engraved. A lever $o$ rotates about a pivot $c'$, secured to the plate $i$. An arm $d'$ is screwed to this plate, and in it is adapted to slide a bent rod $e'$, which can be fixed by means of a screw $e^2$, whereby the tension of a strong helical spring $d^2$, secured to the handle $o$ at its other end, is regulated. A pin $g^2$ engages with a slot in the lever O. A flat spring $h^2$ is secured to the arm $d'$ and is provided with a shoulder $h^3$, which stops the forward movement of the block $j$, and consequently of the burin $h$. By pressing laterally on the end of the spring $h^2$ the shoulder $h^3$ is withdrawn and the burin $h$ is applied against the cylinder to be engraved. To render the burin inoperative, the lever $o$ is drawn back until held by the shoulder $h^3$.

The dividing apparatus comprises the following parts, Figs. 5, 6, 7, 8, and 9: Through the head-stock P passes a shaft A, provided with a sleeve M, destined, as already stated, to hold and rotate the cylinder to be engraved. To the shaft A is keyed a dividing-disk C, preferably of about fifty-seven centimeters in diameter, and provided with, say, seven hundred and twenty divisions. In front there is keyed to the shaft A a second disk D, Figs. 5 and 6, provided on its circumference with a large number of numbered holes destined to receive pins which can be moved as desired. Behind the disk C there is mounted loose on the shaft A an arm E, provided at $G^2$ with two screws, between the points of which is suspended a handle $B^2$, provided underneath with a knife-edge $B^3$, Figs. 7 and 9, adapted to engage with the notches of the dividing-disk C. A spring holds the knife-edge $B^3$ in its notch, and the releasing of said knife-edge from its notch is effected by hand. At the back there is also arranged a toothed wheel H, which can also turn loosely on the shaft A and has secured to it a forked arm $M^2$, open at the top, so as to allow a stop $R^2$ to pass, said arm $M^2$ being also provided with a set-screw $S^2$.

In order to better understand the movement of rotation of the cylinder to be engraved, it is very important to consider that the toothed wheel H and the dividing-disk C are coupled together when the knife-edge $B^3$ of the handle $B^2$ engages with a notch of said cam C.

On a bracket $M^3$, secured to the body of the head-stock P, is pivoted at $J^3$ a balance-beam $J^2$, oscillating about a spindle parallel to the shaft A and having a lug Q, which is held against the pins of the wheel D by means of a spring V. This lug Q can be changed when desired and may have different shapes. The triangular parts $j^3 j^4$, which are fixed on the balance-beam $J^2$, serve to establish a normal contact of two plane surfaces in one direction or the other between the arm $M^2$ and the said beam $J^2$.

The working of the dividing apparatus, which is an important part of the machine according to this invention, is as follows: First, it must be pointed out that it is absolutely necessary to arrange the operation so as to have the last groove engraved in correct position by the side of the first one in spite of variations in intervals between the lines. To attain this end, the dividing apparatus is made in two parts. One enables the operator always to select regularly on the circle an arc of the same number of divisions, and the other automatically varies the length of said arc according to a rule determined beforehand by the operator.

The principle on which this apparatus works will be now explained. Fig. 10. Given a circle rotatable about its center $C^4$, a point $P^4$ taken in this circle, an angle $O^4 M^4 G^4$ capable of rotating about the point $O^4$ with the condition that the side $M^4 G^4$ always passes through the point $P^4$. Let us imagine now that the circle is turned through a certain angle $z$ and that the point $P^4$ arrives at $P^5$. The angle $O^4 M^4 G^4$ will then occupy the position $O^4 M^5 G^5$, the point $A^4$, the intersection of $O^4 M^4$ and of the circle will arrive at $A^5$. That point of the circumference which is now at $A^5$ was before the rotation at $B^4$. It has moved through an angle corresponding to the arc $B^4 A^5$. Returning now to the original position, it will be noticed that if it is desired to bring the point $B^4$ by rotation about the center $C^4$ in contact with the line $O^4 M^4$ it will not be necessary to cause it to travel through the arc $A^4 B^4$, but only through $A^5 B^4$, the arc $A^4 B^4$ being automatically lessened to the extent of the arc $A^4 A^5$. It is easy to see that the smaller the angle $M^4$ the smaller will also be the arc $A^4 A^5$. Fig. 11. It can be proved in the same manner that if $M^4 G^4$ had the opposite direction and became $N^4 K^4$ the arc traversed to bring about the contact instead of being diminished to the extent of $A^4 A^5$ would be, on the contrary, increased to the same extent. Fig. 12. Let us suppose now in this figure, on the one hand, that we have a circle the circumference of which is divided into equal parts 1 2 3 4 5, &c., adapted to rotate about its center and a point $P^6$ taken in this circle, and, on the other hand, a curve $a^3 b^3 c^3 d^3 e^3 f^3 g^3$, adapted to rotate about the point $O^4$ of the line $O^4 L^4$ (secured to said curve) in the plane of the circle $C^4$. If the circle $C^4$ is rotated so as to successively bring its divisions in contact with the line $O^4 L^4$, the point $P^6$ always remaining in contact with the curve $a^3 b^3 c^3 d^3 e^3 f^3 g^3$, the following will happen: First, the arc of rotation of the circle will be smaller than each of its divisions when the point $P^6$ rests on the portion $a^3 b^3 c^3 d^3$ of the curve. Second, the arc of rotation of the circle will be greater than each of its divisions when the point $P^6$ rests on the other part $d^3 e^3 f^3 g^3$ of the curve. Third, these differences will be the greater the steeper the slope of the curve relatively to the line $O^4 L^4$. This Fig. 12 will be completed by arranging other points of rest, like $P^6$, at $p' p^2 p^3$, &c., at such a distance from the center that they always meet the curve. It is not necessary that they should be at equal distances apart. Under these conditions if the circle $C^4$ is rotated and stopped each time that the divisions 1 2 3 successively come in contact with $O^4 L^4$ it will be seen that the line $O^4 L^4$ will have an oscillating motion and that at each stoppage of the circle a variable rotary movement is obtained and the variations are progressive. It will be also found, which is an essential point, that all the parts of the figure will resume their original positions after a complete revolution. The dividing apparatus of the machine acts in the same way. The line $O^4 L^4$ of Fig. 12 corresponds to the rod $J^2$ of the machine, Fig. 6. The curve $a^3 b^3 c^3 d^3 e^3 f^3 g^3$ corresponds to the part Q. The points $P^6 p' p^2$, &c., correspond to the pins $d^4$ of the plate D. Finally, the equal divisions 1 2 3 4, &c., are easily taken on the dividing-disk H by means of a special mechanism, which will be hereinafter described.

As stated, the disk C, Fig. 6, has seven hundred and twenty divisions. Supposing that it is desired to make on the circumference of the cylinder to be engraved two hundred and forty variable divisions, (of course only submultiples of seven hundred and twenty can be used,) it will be necessary to take the divisions from three to three. The movement of the handle $B^2$ will be regulated by means of the screw $S^2$, (the shoulder $R^2$ of said handle alternately striking the point of the screw $S^2$ and the arm $M^2$,) so that the knife-edge $B^3$ of said handle can engage after leaving one notch only one three notches distant. This precaution having been taken, let us assume that the parts occupy the following position: The knife-edge $B^3$ of the handle $B^2$ engages with a notch, the shoulder $R^2$ touches the screw $S^2$, and the arm $M^2$ is in contact with triangular blocks $j^3 j^4$, secured to the under side of the arm $J^2$, as seen more plainly in Fig. 6. The following are the movements required to move the disk: Press the arm $M^2$ against the block $j^3 j^4$ on the arm $J^2$ to fix it, raise the handle B² with the other hand in order to disengage the knife B³, pull said handle B² toward the left until it comes in contact with the arm M² and let it fall into the notch which, according to the way the machine is set, is situated under the knife-edge B³, and finally pull it toward the right in order to bring it in contact with the screw S². It will be seen that in this to-and-fro movement of the handle B² the disk C will turn to a certain extent. It must be remembered that the disk C is keyed to the shaft A, Fig. 5, which carries the sleeve M, destined to receive one of the journals of the cylinder to be engraved. It will be understood that under these circumstances the cylinder will participate in all the movements of the dividing-disk C in such manner that the number of grooves will be thus determined and regulated.

As regards the distance between the grooves and its variation the number of variations and the rule according to which they are made is as follows: It has been seen previously that the movement of the curve $a^3 b^3 c^3 d^3 e^3 f^3 g^3$, Fig. 12, produced an oscillating movement of the line $O^4 L^4$. It will be easy to draw a conclusion from this that the number of pins $d^4$ and their position on the disk D, Fig. 6, will determine the number and situation of the variations of distance on the cylinder to be engraved. It will be also seen that the rule according to which these distances or intervals vary depends on the shape of the curve $a^3 b^3 c^3 d^3 e^3 f^3 g^3$, Fig. 12—i. e., on the shape of the lug Q, Fig. 6.

Should it be desired to stop the movement of the arm J², this will be easily effected by removing all the pins $d^4$ from the disk D and replacing the part Q by a part carrying underneath a pin resting against the circular edge of said disk D, and in these conditions the arm J² will not oscillate.

The working of the whole machine will be now explained, a cylinder to be engraved being chosen as an example. Supposing that it is desired to trace two series of intersecting grooves on a cylinder of twenty centimeters diameter and about 1.03 millimeters in length, the first series will consist of three hundred and sixty wavy grooves inclined according to a helical line with a pitch of 1.03 millimeters multiplied by four, with twenty-five variations of the distances between them. The second series consists of two hundred and forty straight grooves traced parallel to the axis of the cylinder and equidistant from one another. The cylinder previously turned is fixed between the two head-stocks P F, Fig. 1, one of its journals being firmly gripped and carefully centered in the sleeve M. Then by means of the two bolts $n\ n$, Fig. 2, the position of the second part of the slide-rest is regulated relatively to the first by firmly tightening the plate L', Fig. 3, so that the point of the burin nearly touches the cylinder, the lever O, Fig. 3, being pulled into the position of rest. Then the following points must be considered and determined: first, the direction of the grooves; second, their shape; third, their depth; fourth, their number; fifth, the intervals and their variations.

*First. As regards the direction of the grooves.*—The intermediate toothed wheels are arranged between the wheels U and H, Fig. 1, the wheel U making three revolutions for one hundred and four centimeters of the travel of the slide-rest, and while the wheel U is making twelve revolutions, for instance, the wheel H, which is six times larger, will only make two revolutions if driven directly. Therefore in order to obtain one revolution we employ two wheels, one of which is twice as large as the other, so as to reduce to one the number of revolutions of the wheel H, and consequently of the cylinder, during a course of one hundred and four centimeters multiplied by four. The inclination of the lines is therefore thus regulated.

*Second. Shape of the grooves.*—The type of the line to be produced must be chosen. The cam $f$ can give a great variety of them, according to the shape of the groove $f'$. Let us consider, for instance, a sinuous groove of the shape $a^5 b^5 c^5 d^5$, &c., Fig. 13, in which the element $a^5 b^5 c^5 d^5$, &c., has a height $a^5 h^5$ of about five millimeters, and suppose it is desired to engrave a sinuous line, Fig. 14, in which the height $a^6 h^6$ will be of 2.5 millimeters and the elements $a^6 b^6$, $b^6 c^6$, &c., to be twenty-three to twenty-four millimeters long.

Determination of the height $a^6 h^6$: This height is given by the amplitude of oscillation of the burin, the position of which is determined as follows: Referring to Fig. 3, the distance of the pin $g$, engaging with the groove $f'$, from the line of oscillation determined by the points of the two screws $c$, being, say, eight centimeters and $x$ being the distance of the point of the burin $h$ from this line, the oscillations $y$ of the pin $g$ and those $y'$ of the burin will be as $\dfrac{4}{y} = \dfrac{8}{x}$, whence $x = \dfrac{8 y'}{y}$. In the example chosen $X = \dfrac{8 \times 0.25}{0.5} = 4$. It will be necessary to fix the burin-holder so as to have the point of the burin at about four centimeters from the axis of oscillation.

Determination of the length $a^6 b^6$: When the crank N, Fig. 3, makes one revolution, the slide-rest advances by about 34.5 centimeters, and if during this time the cam $f$, provided with seven waves, makes one revolution the burin will trace a groove the wave length of the element of which will be $\dfrac{34.5}{7}$. If the cam makes in this time $n$ revolutions, the length $z$ of the element will be $z = \dfrac{34.5}{7n}$, whence $n = \dfrac{34.5}{7z}$. If $z = 2.4$ centimeters, then $n = 2.05$, or about two. In the above formulæ, $n$ indicates the number of revolutions of the cam. The cam $f$ must therefore make two revolutions during one revolution of the crank. The choice of intermediate toothed wheels to be placed between the wheels V' and X' is then easily made.

In practical application it will be perhaps found more convenient for judging of the effect of a line to do away with calculations and to make several experiments. A simple and practical way of making such experiments without spoiling the cylinders will be hereinafter described.

*Third. The width and depth of the grooves.*— The width of the groove depends on the size of the burin. The depth is regulated by means of the screw $t$ on the plate $k$ and lock-nut $m$.

*Fourth. Number of grooves.*—The number of grooves is regulated by means of the dividing apparatus, as hereinbefore described.

*Fifth. Variation of the intervals.*—It has been shown that the number of variations and the position of the greatest interval correspond to the number and position of the pins $d^4$ on the disk D, Fig. 6. It has been also shown that the rule which these variations follow depends on the choice of the part Q.

All these adjustments having been quickly effected, the machine is set and ready to act. The engraving is effected as follows: Pull the lever O, Fig. 1, so as to remove the burin from the cylinder, and turn the crank N, so as to bring the point of the burin toward the left-hand end of the cylinder, release the burin by pressing on the spring $h^2$, which holds it, and turn the crank N, so as to cause the slide to move toward the right. After a line has been completed bring the slide-rest back to the left, turn the handle $B^2$, trace a new line, as just described, and so on.

Now the second series of straight equidistant grooves parallel to the axis of the cylinder has to be traced. In order to trace straight lines, the machine must be arranged as previously explained. In order to make these lines parallel to the axis of the cylinder, the intermediate wheels U' are done away with, as already explained. To make these lines equidistant, the arm $J^2$ must be fixed. The desired two series of grooves on the cylinder will be thus obtained.

The same combinations of lines can be obtained by means of the same machine on flat surfaces of plates destined to be used for embossing, stamping, and printing, in which case the machine is completed by the following parts: A vertical frame consisting of two cast-iron uprights and stays is strongly secured to the uprights of the bench B, Fig. 15, of the machine for engraving the cylinders previously described. An iron table T can slide vertically along this frame by means of guides $D^6 E^6$, Figs. 15, 16, 17, the guide $E^6$ preventing it from moving away under the pressure of the burin, while the guide $D^6$ guides it in its vertical movement. Balance-weights $F^6$ maintain the equilibrium. Finally a tooth-rack $G^6$ engages with the wheel X, keyed to the shaft A. The table T is provided with vertical grooves T', in which are adapted to slide bolts provided with tightening-nuts, serving to fix the plate $T^2$ to be engraved. The support $a$ of the burin, Fig. 18, will have to be moved to the other end of the plate L'. This arrangement necessitates an addition to the spindle Y' of an extension $Y^2$, screw-threaded at $Y^3$. The toothed wheel which in the first arrangement drove the cam $f$ will be fixed at $X^2$. A bracket $Z^2$, provided with a bearing, supports the end of the spindle. All the movements previously described with reference to a cylinder to be engraved are made by the wheel X, which transmits them to the tooth-rack $G^6$, and consequently to the plate $T^2$ to be engraved. The operations to be made, as well as the adjustment of the machine, for engraving a plate are absolutely the same as for engraving a cylinder.

The simple and practical means of making experiments in order to be able to judge of the effect produced by a line without damaging the cylinders, so as to be able to study different combinations of lines before proceeding to engrave a cylinder, consists in fixing on said cylinder by any desired means— say by applying sealing-wax or gum at a few points—a sheet of paper well stretched and replacing the burin by a pencil. Then the arrangements made and parts used for each operation are carefully noted, viz: For the direction of lines, the wheels used as intermediate wheels for obtaining the rotation of the cylinder, (if rotation takes place;) for the shape of the lines, the number of the cam, (each different cam must be numbered,) the intermediate wheels for determining the speed of rotation of said cam, the position of the burin-holder on the oscillating plate, which position is ascertained by noting the corresponding division; for the number of lines, the number of divisions taken on the dividing-disk at each movement of the handle; for the variation of the intervals between the lines, if the engraving is effected with varying intervals, the number of the pins $d^4$ placed on the disk D must be noted and the numbers of holes of said disk into which they have been placed if the variations are not uniform. For the rule of these variations note the number or shape of the part Q, which presses against the pins $d^4$. These observations can be engraved by means of a dry point on one of the ends of the engraved cylinder, so that it will be easy to reproduce an engraving of the same kind.

The machine according to this invention as described enables lines to be traced on cylinder the inclination of which varies within certain not very wide limits—*i. e.*, they can be parallel to the axis of the cylinder or form with it an angle up to about forty-five degrees.

Certain modifications may be made in the machine in order, first, to enable helical lines of any pitch, even of only a few millimeters, to be traced on the cylinders; second, to enable circular lines or circles either equidistant or at different intervals regulated by the dividing-disk to be traced on the cylinders. These modifications are as follows: As regards the dividing apparatus the principle of the mechanism to vary the distances between the grooves remains the same, the same dividing-disk is retained as well as the oscillating lever terminating in an interchangeable part Q of varying shapes, which strikes the pins $d^4$ of the small disk D, provided with holes. The sector $M^7$, Figs. 21, 22, 23, which replaces the arm $M^2$ of the first construction, is not screwed permanently to the toothed wheel H, but can be independent of it or connected to it by means of two screws. The circular groove of the arm $M^7$ enables a great distance to be obtained between the fixed stop $H^7$ and the movable stop $K^7$. The arm $G^7$ carries an operating-lever $G^{15}$, provided with a handle $B^{12}$, which does not move as formerly between points, but swings around the shaft $S^7$, which is mounted on the arm $G^7$ in a plane parallel to the divider-plate. This lever $G^{15}$ terminates at the end opposite to the handle $B^{12}$ in a knife-edge $B^3$, which carries a stud $R^7$, provided to determine the number of teeth which the knife is to pass by striking alternatively the stops $H^7$ and $K^7$. The knife-edge $B^3$ engages in the divisions of the divider-plate C and is held in position by the spring $V^7$ acting against the under side of the handle $B^{12}$. The provision of the handle $B^{12}$, as above described, will not prevent complete rotation of the dividing apparatus. A stop $L^7$ can be moved back longitudinally in order to give passage to the small stud $R^7$, which is above the knife $B^3$. Said knife-edge $B^3$, as stated, is mounted on the end of lever $N^2$, and the stud $R^7$ projects upward from this edge. The oscillating arm $J^2$ is provided with a rod $L^7$, movable endwise in a socket $F^7$. This rod serves to determine the stoppage of the part $M^7$. On the front of the dividing-disk C is secured, concentrically, the toothed wheel $D^7$. Finally, and this is important, the dividing-disk C and the toothed wheel H can be keyed to the shaft A or rotate freely on it, as desired. This is effected by means of an easily-removable key.

Other modifications in the machine may be as follows: an addition of a screw $G^8$, Fig. 19, which passes through a nut $K^8$, secured to the bracket $K'$ of the slide K by means of two screws $k^8$, enabling the nut $K^8$ to be easily removed when desired. The screw $G^8$ is connected to the toothed wheel $D^7$ by means of a toothed wheel $B^7$, Figs. 21 and 22, a connection that can be easily removed. The spindle $O'$, Figs. 24, 25, passes, as before, through a bearing $N'$. The two wheels $E'$ $F'$ are in this case independent of each other and can be secured to this spindle by a set-screw or withdrawn, as desired. A nut $H^8$, Fig. 25, has passing through it the endless screw G and, like the nut $K^8$, can be secured to the bracket of the slide by means of two screws or removed, as desired.

The working of the machine with the above modifications is as follows: When the dividing-disk is keyed to the shaft A, the wheel H rendered free on said shaft, Figs. 21, 22, and the part $M^7$ secured to said wheel by means of a screw, the dividing apparatus acts in absolutely the same manner as described. In this case it is necessary to take care to unscrew the nut $K^8$, Fig. 24, which causes the slide to participate in the movement through the intermediary of the endless screw $G^8$. (Shown on the right-hand side in Fig. 24.)

If it is desired to obtain helical lines of a very large pitch—between, say, twenty meters and forty centimeters—the nut $H^8$ is removed and the wheel $F'$, Figs. 24 and 25, is keyed on. The slide-rest is then caused to participate in the movement, as described in the first instance, by means of the wheel $F'$; but when the pitch is to be between forty centimeters and six or eight millimeters the wheel $F'$ is rendered loose and the nut $H^8$ is screwed on the slide-rest. It will be seen that in this case the pitch of the helical line is considerably reduced, as at each revolution of the shaft A the slide advances only to the extent of one division of the screw G—that is to say, six or eight millimeters—instead of advancing through the whole development of the wheel $F'$—that is to say, about thirty-four centimeters.

In order to be able to engrave on the cylinder circular lines, either equidistant or at variable intervals, it is necessary to connect, by means of a coupling-key, the wheel H to the shaft A, to remove the screw which couples said wheel to the part $M^7$, and to disconnect (by removing the coupling-key) the dividing-disk C and the toothed wheel $D^7$, so as to render them loose on the shaft A; to secure the wheel $B^7$ (shown in position in dotted lines) to the screw $G^8$, (it will be readily seen that the wheel $B^7$ serves to transmit to the screw $G^8$ all the movements of the dividing-disk,) and to remove the nut $H^8$, Fig. 25, as well as the wheel $F'$—in short, all that operates the advance of the slide through the intermediary of the shaft A and screw G. This having been done, the dividing apparatus must be arranged, as explained before, according as it is desired to obtain variable or constant intervals. All these arrangements having been made, the apparatus works as follows: At each movement the dividing-disk will turn to a determined extent without causing the cylinder to turn, but causing the screw $G^8$, Figs. 21, 22, to participate in the movement through the intermediary of the wheel $B^7$. The slide will be caused to move to a slight extent by the nut $K^8$, Fig. 8, but it will not move when the handle N, attached to the spindle $O'$, is turned. The movement of this spindle will be transmitted by the wheels E' D' and the bevel-wheels to the screw G, which in its turn transmits their rotary motion to the wheel H through the wheel B⁸, Figs. 21 and 22, and the intermediate wheel, and then the cylinder will be caused to rotate in front of the stationary slide-rest.

There is another modification that may be made without altering the spirit of the invention. The grooved screw G, Fig. 24, may be replaced by the following device: G⁹, Figs. 19 and 21, is a cylindrical rod rotating between bearings and provided with a groove G¹⁰ throughout the whole of its length, (like the endless screw which it replaces,) and similar bevel-pinions B' C² are employed as in the first construction. The wheel that engaged with the screw for quickly moving the slide-rest is here placed at D⁹ (shown dotted in position, Fig. 19,) by the side of the wheel D' and engages with a tooth-rack D¹⁰. The nut K³, which has been screwed to the slide-rest and received its movement from the screw G for the slow advance of the slide-rest and for forming helical lines of very small pitch, is here replaced by a worm P⁷, Fig. 20, which is fixed to the socket P⁸, carrying the bevel-pinion B'. This worm therefore turns with the pinion and engages with a tooth-rack C⁸ and gives the same results as the nut which is replaced. This modified arrangement is pointed out, as it may give more exact results than the first. On the oscillating plate two or more burins could be also arranged and caused to work during the return as well as advance movements, or the burin could be rotated, or burins with several points could be used for tracing concentric circles, arcs, &c., or the burin could be given a movement from the front backward from the shaft on which the cam is mounted or by any other means either for obtaining interrupted lines or for mechanically engraving circles, arcs, or other figures at determined points.

We claim—

1. In an apparatus of the character described, a dividing apparatus comprising a shaft, means for securing a cylinder to be engraved to the shaft, a disk C secured to the shaft and having uniform divisions, a disk D secured to the shaft and having a series of pins, a pivoted arm, a lug Q on said arm adapted to engage the pins, an arm loose on the shaft, a handle pivotally carried by the arm and adapted to engage with the divisions of disk C, a toothed wheel H carried by the shaft, a forked arm or block M² on the wheel H and an adjustable screw S² carried by the arm M², all arranged for coöperation as described.

2. In an apparatus of the character described, a dividing apparatus comprising a shaft, means for securing a cylinder to be engraved to the shaft, a disk C secured to the shaft and having uniform divisions, a disk D secured to the shaft and having a series of pins, a pivoted arm, a lug Q on said arm adapted to engage the pins, an arm loose on the shaft, a handle pivotally carried by the arm and adapted to engage with the divisions of disk C, a toothed wheel H carried by the shaft, a forked arm or block M² on the wheel H and an adjustable screw S² carried by the arm M², a screw G, gearing between the latter and the wheel H, and a burin-support and connections between the burin-holder and the screw G whereby the former will be operated by the screw G as described.

3. In an apparatus of the character described, the combination with a dividing apparatus, adapted to support the cylinder to be engraved, of a grooved screw-spindle G, gearing adapted to effect the rotation of the said cylinder from the screw-spindle G, a slide-rest comprising a slide K', a bracket thereon having openings as described, a socket passing through one of the openings, a bevel-pinion on the socket, a projection on the socket engaging the groove of spindle G, a spindle C' passing through the other opening, a bevel-pinion on the latter spindle engaging the other bevel-pinion, a toothed wheel D' on spindle C', hollow sleeve M' carried by the slide K', and toothed wheels E' F' secured to sleeve M', the said wheel E' engaging the wheel D', all arranged and adapted for coöperation as and for the purpose described.

4. In an apparatus of the character described, the combination with a dividing apparatus adapted to support the cylinder to be engraved, of a grooved screw-spindle G, gearing adapted to effect the rotation of the said cylinder from the screw-spindle G, a slide-rest comprising a slide K' mechanism intermediate the latter and the screw-spindle whereby the slide is reciprocated, a plate L' adjustably connected to the slide, a spindle O' supported by the plate, a wheel V' on the spindle, sector T' having grooves T² T³ and rotatably mounted on the spindle, screw S', spindle Y', wheel X' thereon, intermediate wheels Z Z', a cam on spindle Y' and having a groove, an oscillatable plate b, a sector thereon having a circular groove through which passes spindle Y', and a pin on the sector engaging the groove of the cam, all as and for the purpose specified.

5. In an apparatus of the character described, the combination with a dividing apparatus adapted to support the cylinder to be engraved, of a grooved screw-spindle G, gearing adapted to effect the rotation of the said cylinder from the screw-spindle G, a slide-rest comprising a slide K' mechanism intermediate the latter and the screw-spindle whereby the slide is reciprocated, a plate L' adjustably connected to the slide, a spindle O' supported by the plate, a wheel V' on the spindle, sector T' having grooves T² T³ and rotatably mounted on the spindle, screw S', spindle Y', wheel X' thereon, intermediate wheels Z Z', a cam on spindle Y' and having a groove, an oscillatable plate b, a sector thereon having a circular groove through which passes spindle Y', and a pin on the sector engaging the groove of the cam, a burin-holder comprising a plate having a dovetail groove, a block engaging the groove, a burin carried by the block, and means for varying the depth of cut of the burin.

6. In an apparatus of the character described, the combination with a dividing apparatus adapted to support the cylinder to be engraved, of a grooved screw-spindle G, gearing adapted to effect the rotation of the said cylinder from the screw-spindle G, a slide-rest comprising a slide K' mechanism intermediate the latter and the screw-spindle whereby the slide is reciprocated, a plate L' adjustably connected to the slide, a spindle O' supported by the plate, a wheel V' on the spindle, sector T' having grooves $T^2$ $T^3$ and rotatably mounted on the spindle, screw S', spindle Y', wheel X' thereon, intermediate wheels Z Z', a cam on spindle Y' and having a groove, an oscillatable plate $b$, a sector thereon having a circular groove through which passes spindle Y', and a pin on the sector engaging the groove of the cam, a burin-holder comprising a plate having a dovetail groove, a block engaging the groove, a burin carried by the block, and means for varying the depth of cut of the burin, a lever pivotally mounted on the plate and having a slot, a lug or arm on said plate, a rod adjustably carried by the arm, a spring secured at opposite ends to the lever and rod, a pin engaging within the slot of the lever, a spring secured to the lug or arm, and having a shoulder, all as and for the purpose specified.

7. In a machine of the character described, the combination with a burin-support comprising a slide, of a screw-spindle having a longitudinal groove, a socket having an interior projection engaging said groove, a bevel-wheel on the socket, a spindle C', a bevel-pinion thereon engaging the bevel-wheel on the socket, a toothed wheel on spindle C', a socket M', toothed wheels F', E', thereon and engaging respectively with the screw-spindle and the toothed wheel on spindle C', means for supporting a cylinder to be engraved, and transmission-gearing intermediate said cylinder-supporting means and the screw-spindle.

8. In a machine of the character described, the combination with a burin-support comprising a slide, and means for advancing the same, of a plate secured to the slide, a spindle having a longitudinal groove and carried by the plate, a socket having a projection engaging the groove, a toothed wheel on said spindle, a sector having grooves as described and mounted to rotate on the spindle, toothed wheels Z, Z', the spindle whereof engages one of the grooves of the sector, a spindle Y', a toothed wheel thereon engaging the wheel Z', a grooved cam on the spindle Y', an oscillatable plate $b$ a slotted sector thereon and through the slot of which the spindle Y' passes, and a connection between the latter sector and the groove of the cam.

In testimony whereof we have hereto set our hands in the presence of the two subscribing witnesses.

PAUL VICTOR AVRIL.
 ERNEST EDOUARD MARINIER.
 EUGÈNE LOUIS NAVOIT.

Witnesses:
 LOUIS SULLIGIR,
 EDWARD P. MACLEAN.